Figures 1, 2:
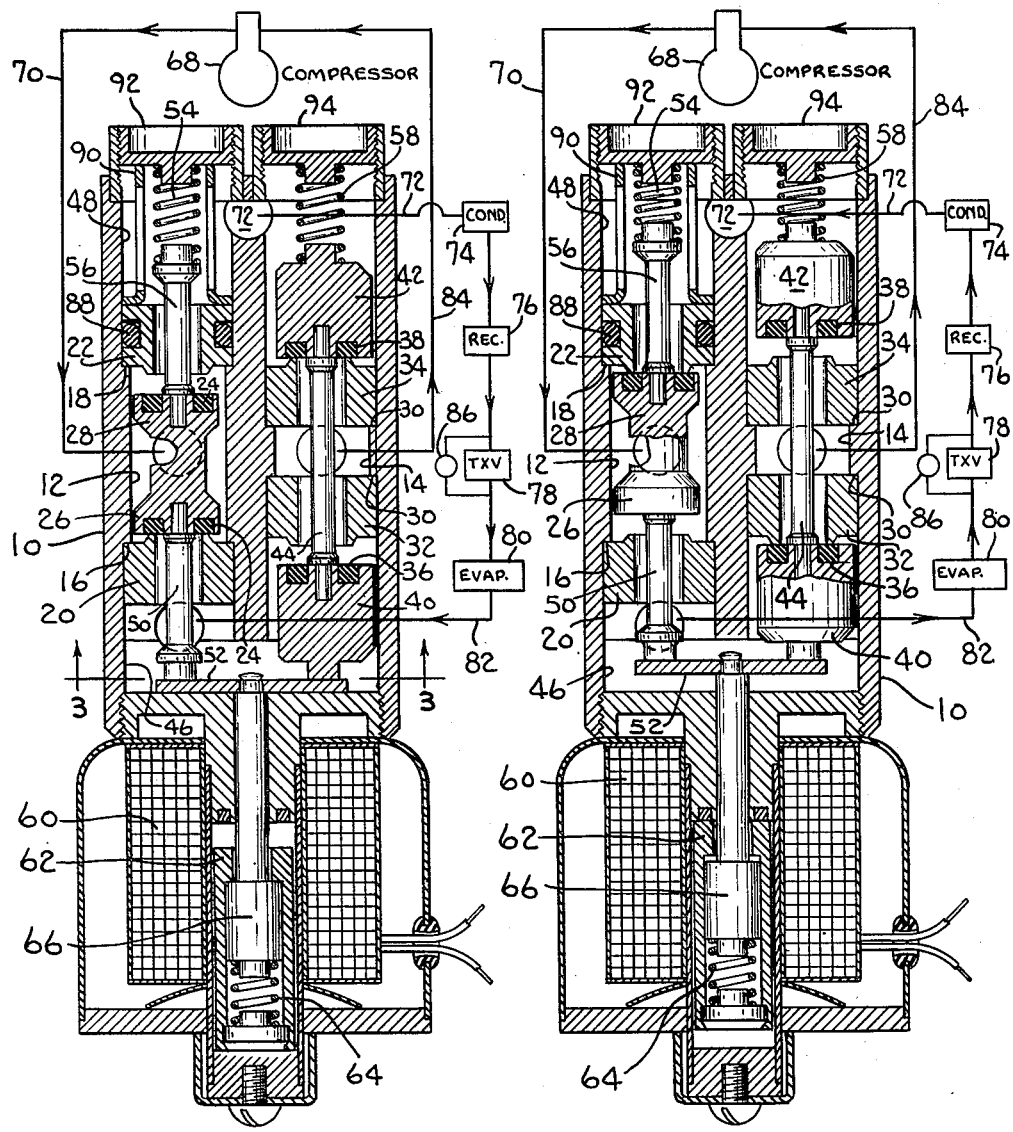
Figure 3:
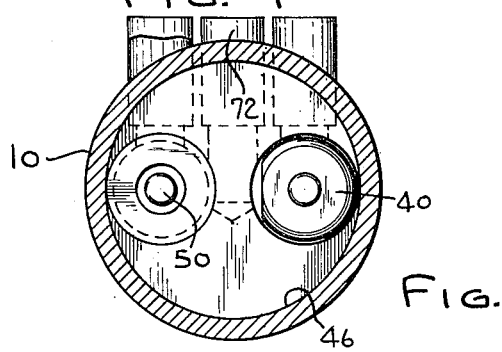

May 17, 1955   E. C. EHLKE   2,708,561
FOUR-WAY VALVE
Filed Feb. 18, 1952

INVENTOR.
EDWARD C. EHLKE
BY John W. Michael
ATTORNEY

United States Patent Office 2,708,561
Patented May 17, 1955

2,708,561

FOUR-WAY VALVE

Edward C. Ehlke, Milwaukee, Wis., assignor to AP Controls Corporation, Milwaukee, Wis., a corporation of Wisconsin Application February 18, 1952, Serial No. 272,051

10 Claims. (Cl. 251—129)

This invention relates to a four-way valve which may be produced at low cost and which is not subject to the leakage problems usually encountered in such valves.

Four-way valves heretofore available have been costly, relatively delicate affairs involving rather complicated structures designed to prevent leakage. The high cost of these valves has precluded the development of large markets, particularly in the refrigeration and air conditioning fields where such a low cost valve would make fast defrosting and reversible heat pump systems commercially practical.

An object of this invention, therefore, is to provide a simple, rugged, low-cost four-way valve.

Another object is to provide a four-way valve which may be mounted in any position, thus facilitating design of complete systems.

Another object is to provide a four-way valve in which the valves seat positively and are not subject to leakage.

A further object is to provide a four-way valve which can handle high pressures without leakage and limited only by the structural strength of the parts.

Still another object is to provide a four-way valve which may be operated by a small solenoid.

Other objects and advantages will be pointed out in, or be apparent from, the specification and claims, as will obvious modifications of the single embodiment shown in the drawings in which:

Fig. 1 is a vertical section through the valve in its normal position and includes a schematic representation of a refrigeration system;

Fig. 2 is similar to Fig. 1 but shows the valve in position for reversing flow; and Referring to the drawings in detail, valve body 10, cast or of bar stock, is provided with two parallel bores 12, 14 which respectively serve as high and low pressure chambers. The high pressure chamber is provided with spaced shoulders 16, 18 which serve to position ported metallic valve seats 20, 22. These seats face each other and the non-metallic annular inserts 24, 24 in the face of interconnected valves 26, 28 alternately seat thereon to direct flow from the chamber. Similarly the low pressure chamber is shouldered at 30, 30 to receive ported seats 32, 34, each facing an end of the bore to receive annular inserts 36, 38, in the face of valves 40, 42 interconnected by pin 44. Bores 12, 14 communicate at each end through manifold chambers 46, 48. Pin 50 projects from valve 26 to rest on plate 52 as does valve 40. Compressed spring 54 acts on pin 56 mounted in valve 28 to urge the pair of valves 26, 28 downwardly (Fig. 1) and spring 58 acts on valve 42 to urge the pair of valves 40, 42 downwardly in a similar manner. (It will be noted that all the valves cooperate closely with the bores to guide the valve assemblies in their movement. Each valve is flattened on one side to allow flow past the valve through the bore in which the valve is located.)

The valves are shifted to the position shown in Fig. 2 by a solenoid having a coil 60 which, when energized, lifts armature 62 upwardly to the position shown in Fig. 2. Spring 64 compressed between the armature and pin 66 lifts the pin until the valves are seated in the position shown in Fig. 2. This solenoid is the conventional chatter-free type of design. It will be noted that the upper end of pin 66 is peened to loosely connect the pin to plate 52 which acts on the valve assemblies. The solenoid is, of course, hermetically sealed with respect to valve casing 10.

This valve is designed principally for use in refrigeration systems. The high pressure chamber 12 is connected to the outlet of compressor 68 by means of conduit 70. When the valves are in the position shown in Fig. 1, flow from the compressor is directed through ported seat 22 into upper manifold chamber 48 provided with outlet 72 connected to condenser 74 which, in turn, is connected to receiver 76 in the conventional manner. Liquid refrigerant flows from the receiver under the control of thermostatic expansion valve 78 to evaporator 80, which is connected to lower manifold chamber 46 by conduit 82. The gaseous refrigerant flows from the lower manifold chamber through ported seat 32, through outlet 84 in low pressure chamber 14 to the compressor intake. When it is desired to reverse the refrigeration system to defrost the evaporator, the solenoid is energized to shift the valves to the position shown in Fig. 2. In order to keep the solenoid size (and the cost) to a minimum, the system should be allowed time to equalize pressures so that the valves do not have to work against pressure when shifting from one position to the other. This may be accomplished by means of a timed switch or by means of pressure responsive controls (not shown). When the solenoid is energized to move the valves to the position shown in Fig. 2 flow from the high pressure chamber is directed through seat 20 into chamber 46 and flows from the chamber directly to the evaporator which now becomes hot to accomplish the defrosting. The thermostatic expansion valve is by-passed by means of check valve 86 to allow refrigerant to flow to the receiver and thence to the condenser connected to chamber 48. Flow from chamber 48 is directed to the low pressure chamber 14 connected to the compressor intake.

The clearance between the flat side of each valve and the walls of the bore in which the valve is positioned is great enough to avoid any appreciable pressure drop past the valve proper. Similarly, the pressure drop past a valve opening is not appreciable. Therefore, in Fig. 1, for example, the pressure above valve 28 in bore 12 or in chamber 48 is substantially the same as the inlet pressure while the pressure in chamber 46 and bore 14 is substantially the same as the outlet (compressor suction) pressure. Bore 12 and chamber 48 are at high pressure and chamber 46 and bore 14 are at low pressure (it being remembered that between chamber 48 and chamber 46 are positioned the condenser, receiver, thermostatic expansion valve, and evaporator which occasion a pressure drop). This condition would obtain even if the valves and valve ports did cause pressure drops since the high pressure flow path and low pressure flow path pass the same number of restrictions and, if anything, the pressure in bore 14 would be less due to the greater volume passed therethrough as a result of expansion. In all events there must be the pressure differential in order to have flow through the circuit. Therefore, pressure acts to seat the valves. In Fig. 1 the inlet pressure acts on the face of valve 28 opposed only by low pressure in chamber 46 acting on only a small area of the face of valve 26. Similarly, the high pressure in chamber 48 acts on valve 42 to seat valve 42 against low pressure in bore 14. When the valve is reversed the inlet pressure acts on valve 26 to seat valve 28 against low pressure in chamber 48 while high pressure in chamber 46 opposes low pressure in chamber 14 to hold valve 40 on its seat.

It will be noted that when the valves are in either position the pressure differential forces the valves to their seats. Therefore the solenoid need be energized for reversal only until the compressor is placed into operation to establish a pressure differential across the valves which will then hold the valves in the position shown in Fig. 2. Upon completion of the defrosting the compressor may be de-energized and when the pressure differential across the valves is about equalized the springs 54, 58 will drive the valves back to the position shown in Fig. 1.

If this valve is to be used in a heat pump system where the reversal of flow is to be maintained for a considerable period of time, manual or other means for effecting movement of the valves may be employed rather than continuously energizing the solenoid as would be necessary if the compressor operation were intermittent and allowed the pressure differential across the valves to decrease to the point where the springs would return the valves to the position shown in Fig. 1.

It will be noted that this valve may be fabricated at low cost due to the construction employed. No valve guides are necessary since the valves are guided by the bores in which they move. High pressure valve seat 20 and both low pressure valve seats 32, 34 may be soldered in the bores prior to assembly of the valve. The remaining valve seat, high pressure seat 22, is mounted after the high pressure valves have been placed in the high pressure chamber. Seat 22 is provided with an O-ring seal 88 in a peripheral groove and is held in place by means of ported spacer 90 bearing against the top of the seat and the underside of cap 92 which seals the end of the bore in a manner similar to cap 94.

By using flat non-metallic valve faces I eliminate leakage problems due to machining errors and considerably reduce the cost of the valve. The manner of actuating the two pairs of valves through rockable plate 52 insures proper seating of the valve under all conditions. Since the pressure differential always acts on the seated valve to force the valve to its seat the only limitation on the pressure differentials handled by the valve lies in the structural strength of the various parts. The power movement of the valves in both directions permits mounting the valve in any position.

Although but one embodiment of the present invention has been illustrated and described, it will be apparent to those skilled in the art that various changes and modifications may be made therein without departing from the spirit of the invention or from the scope of the appended claims.

I claim:

1. A four-way valve comprising, a casing having an inlet chamber and an outlet chamber, each chamber having aligned orifices, an inlet conduit connected to the inlet chamber and adapted to receive high pressure fluid, an outlet conduit connected to the outlet chamber and adapted to be connected to a suction line, a first manifold chamber communicating with the inlet and outlet chambers by means of one of the orifices in each chamber, a second manifold chamber communicating with the inlet and outlet chambers by means of the other of the orifices in each chamber, a valve stem passing through the aligned orifices in the inlet chamber, a pair of valves mounted on said stem within said inlet chamber with their faces disposed in opposite directions and spaced to close off one of the orifices at a time, another valve stem passing through the aligned valve orifices in the outlet chamber, a pair of valves mounted on said other stem each within a manifold chamber with their faces disposed toward each other and spaced to close off one of the orifices at a time, the faces of said valves being non-metallic to allow the face to conform to its seat, a conduit connection in each of the manifold chambers and adapted for connection to apparatus through which fluid may flow in either direction, means sealed with respect to said casing and operably connected to said stems to actuate the stems in the same direction, said valves serving to direct flow from the inlet to one of the manifold chambers and from the other of the manifold chambers to said outlet and the pressure differential across the valves tending to hold the valves on their seats.

2. A valve according to claim 1 in which said actuating means comprises a solenoid operable to move the stems to a secondary position and including a spring acting on each stem to urge the stems to their normal position against the direction of solenoid pull.

3. A valve according to claim 2 in which the solenoid armature is connected to said stems by means of an intermediate plate rockably connected to the armature and bearing on the stems, said rockable connection permitting adjustment of the valves to their seats.

4. A four-way valve comprising, a casing, an inlet chamber in the casing having an inlet adapted to receive a high pressure fluid at all times and having two aligned outlet ports, a valve stem passing through said outlet ports, a pair of valves mounted on said stem in said chamber and adapted to close said ports one at a time as the stem is moved along its axis, a pair of manifold chambers in said casing, each communicating with one of said ports, a conduit in each manifold chamber adapted for connection to apparatus through which fluid may flow in either direction, an outlet chamber in the casing having an outlet adapted for connection to a suction line and having aligned inlet ports each communicating with one of the manifold chambers, a valve stem passing through said inlet ports and said outlet chamber, a pair of valves mounted on said outlet chamber stem and each located in one of the manifold chambers and adapted to close said inlet ports one at a time as their stem is moved back and forth along its axis, a spring urging each stem to a normal position, means connected to said stems and operable to move the stems simultaneously in the same direction in opposition to the bias of said springs, said valves being moved when the pressures acting on the valves have substantially equalized and being held in either position by the pressure differential across the seated valves upon re-establishment of the pressure differential by external means.

5. A valve according to claim 4 in which each port is provided with a metallic seat facing the valve cooperating with the port and each valve has a non-metallic face adapted to close on said seats and to conform thereto to prevent leakage.

6. A four-way valve comprising, a casing having two parallel bores communicating with each other at their ends to form a manifold chamber at each end of the bores, a pair of spaced ported seats in each bore to define a central pressure chamber in each bore, an inlet conduit connected to the central pressure chamber in one bore and adapted to be connected to a high pressure fluid source, an outlet conduit connected to the central pressure chamber in the other bore and adapted to be connected to a low pressure fluid suction line, a conduit connected to each manifold chamber and each adapted for connection to apparatus through which fluid may flow in either direction, a pair of valves mounted on a common stem in the high pressure chamber and adapted to direct flow through one of the ported seats at a time, a valve in each manifold chamber mounted on a stem passing through the low pressure chamber and adapted to direct flow through one of the ported seats at a time, each of said valves closely cooperating with the bore in which it is mounted to guide the valves in their movement, a spring acting on each of said stems to bias said valves to a normal position, and means acting on said stems to move the valves simultaneously in the same direction into position to reverse the direction of flow from said manifold chambers.

7. A valve according to claim 6 in which each of the ported seats is metallic and each of the valves is provided with a non-metallic face which conforms to the cooperating seat when the valve is seated.

8. A valve according to claim 7 in which the moving means is connected to said stems by apparatus permitting differential movement to be imparted to the stems to insure valve seating.

9. A valve according to claim 6 in which the ported seats in the low pressure bore and the seat in the high pressure bore closest to said means are soldered in their respective bores and the other seat is provided a seal ring sealing the seat with respect to its bore, and means holding said other seat in said bore.

10. A valve according to claim 6 in which the valves cooperate with the bores in which they are mounted to guide movement of the valves.

References Cited in the file of this patent
UNITED STATES PATENTS

| | | |
|---|---|---|
| 1,511,974 | Lindmann | Oct. 14, 1924 |
| 1,657,739 | Carey | Jan. 31, 1928 |
| 2,145,575 | Zwickl | Jan. 31, 1939 |
| 2,194,877 | Steiger | Mar. 26, 1940 |
| 2,218,861 | Stumpf | Oct. 22, 1940 |
| 2,515,029 | Almond et al. | July 11, 1950 |
| 2,534,031 | Kollsman | Dec. 12, 1950 |
| 2,558,938 | Dillman et al. | July 3, 1951 |
| 2,570,450 | Hottenroth | Oct. 9, 1951 |